(12) United States Patent
Waterford

(10) Patent No.: US 7,369,760 B1
(45) Date of Patent: May 6, 2008

(54) SUBMERSIBLE SPLASH HOUSING

(76) Inventor: Steve Waterford, 2040 Sherman St., Suite L, Hollywood, FL (US) 33020

( * ) Notice: Subject to any disclaimer, the term of this patent is extended or adjusted under 35 U.S.C. 154(b) by 171 days.

(21) Appl. No.: 11/130,446

(22) Filed: May 16, 2005

(51) Int. Cl.
*G03B 17/08* (2006.01)
(52) U.S. Cl. ............................ 396/27; 348/81; 352/242
(58) Field of Classification Search ................. 396/25, 396/26, 27, 419; 353/242; 348/81; 352/242
See application file for complete search history.

(56) References Cited

U.S. PATENT DOCUMENTS

| | | | |
|---|---|---|---|
| 3,065,666 A * | 11/1962 | Sampson | 396/27 |
| 4,281,343 A * | 7/1981 | Monteiro | 348/81 |
| 4,853,722 A * | 8/1989 | Gell, Jr. | 396/26 |
| 5,159,366 A | 10/1992 | Gell, Jr. | |
| D332,459 S * | 1/1993 | Morimiya | D16/208 |
| 5,289,215 A | 2/1994 | Clairmont et al. | |
| 5,305,031 A * | 4/1994 | Hayakawa | 396/26 |
| 5,349,411 A | 9/1994 | Beauviala | |
| 5,708,902 A | 1/1998 | Navarro | |
| 6,819,866 B2 | 11/2004 | Da Silva | |

* cited by examiner

*Primary Examiner*—Christopher Mahoney
(74) *Attorney, Agent, or Firm*—Gold & Rizvi, P.A.; Glenn E. Gold; H. John Rizvi

(57) ABSTRACT

A shallow water submersible splash housing which is capable of sealing and protecting a camera from an underwater or harsh environment for filming is disclosed. The shallow water submersible splash housing includes an elastomeric transparent enclosure having front and rear ends, a front port assembly closing the front end of the enclosure for supporting the camera and a window provided in the front port assembly. A back plate assembly closes the rear end of the enclosure. The front port assembly may further be provided with iris rods to facilitate mounting of the camera in the enclosure and interior air flow nozzles to maintain positive air pressure in the enclosure as well as prevent fogging of the window in the front port assembly.

20 Claims, 5 Drawing Sheets

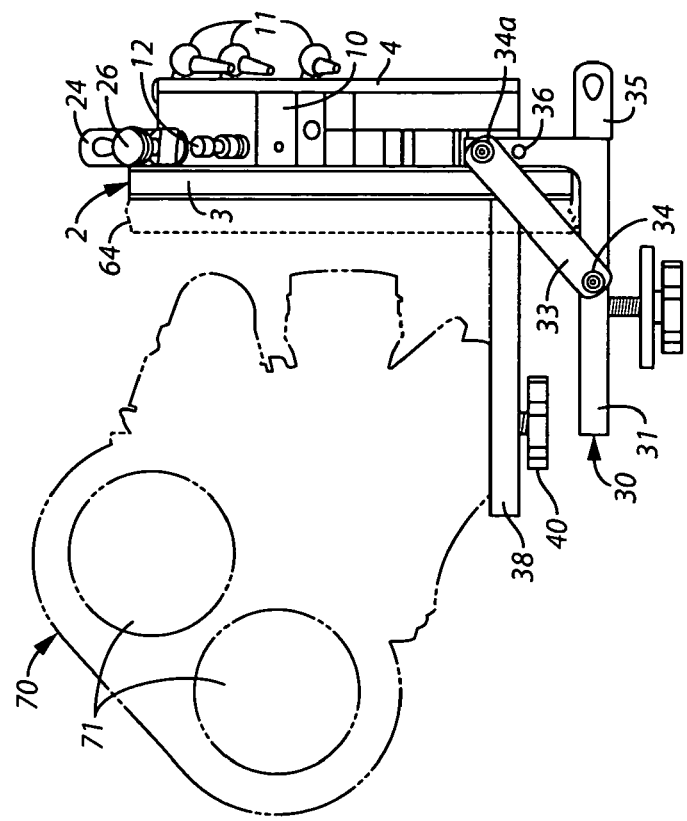
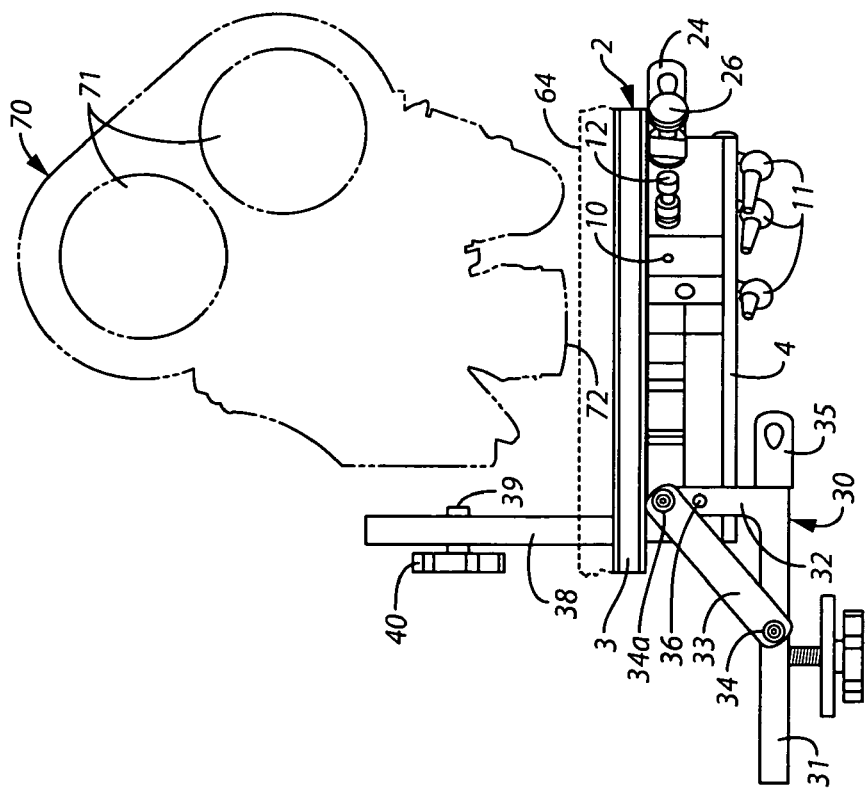
FIG. 4
FIG. 3

SUBMERSIBLE SPLASH HOUSING

FIELD OF THE INVENTION

The present invention relates generally to splash housings for cameras. More particularly, the present invention relates to a shallow-water submersible splash housing which includes a flexible, bag-like enclosure and is suitable for containing and protecting any of a variety of motion-picture or video cameras from harsh and/or water environments.

BACKGROUND OF THE INVENTION

In many filming applications, such as the filming of motion pictures or amateur filming using a video camera, for example, it is desirable to film underwater or in harsh environments which could potentially damage a motion picture camera, video camera or the like. In underwater filming applications, for example, it is desirable to seal the camera in a watertight enclosure that is capable of being submerged in water. The enclosure prevents water from contacting and damaging the camera while facilitating filming of underwater images, such as marine life or underwater swimming or other events, for example, using the camera.

Various types of camera enclosures are known in the art for containing and sealing a camera in an underwater or other environment. However, the known camera enclosures are typically designed only for a particular type of camera or for use in a particular type of environment. For example, U.S. Pat. No. 5,159,366 discloses an underwater housing and pressure compensation method and apparatus for protecting a camera or other apparatus from a water environment using a flexible, pressure-compensated bag-like housing that is maintained at a slight positive pressure. The housing is capable of containing only small disposable cameras and is designed exclusively for underwater use.

U.S. Pat. No. 5,289,215 discloses a variable-position lens-mounting accessory for motion-picture cameras and method of use. The accessory permits swing, shift, tilt and rise-and-fall movements between a lens and a motion-picture camera to manipulate focal relations and image shapes. Preferably, the device rests on rails or "iris rods" of a balance plate or base that is secured beneath the camera.

U.S. Pat. No. 5,349,411 discloses a filter and matte box support system including a matte box assembly for use on cameras to support a plurality of filters. The matte box assembly includes first and second support arms connected to and supporting separate modules of the matte box such that a rotating filter support module is rotatable independently of the other modules.

U.S. Pat. No. 5,708,902 discloses a matte box support assembly for use on cameras to support a plurality of filters. The matte box assembly includes a support bracket, which supports the matte box and axially translates toward and away from the lens and, in a separate action, pivots 90 degrees away from the lens. The assembly includes a crank arm for actuating both the axial translation and the pivoting action sequentially.

U.S. Pat. Nos. 5,289,215; 5,349,411; and 5,708,902 represent the prevailing use of iris rods to mount objects to the front of a camera rather than mounting the camera to a mounting frame that holds the camera.

U.S. Pat. No. 6,819,866 discloses a watertight universal housing which allows video cameras or other electronic devices to be operated underwater. The watertight universal housing includes a sealable internal cavity adapted to receive a remotely-controllable electronic device, a programmable controller and an electromagnetic signal transmitter which is controlled by the programmable controller. The programmable controller is designed to receive a command to control the remotely-controllable electronic device from a command-providing device. The controller then causes the electromagnetic signal transmitter to selectively transmit the electromagnetic signals corresponding to that command to the remotely-controllable electronic device.

What is needed is a shallow-water submersible splash housing which includes a flexible, bag-like enclosure and is suitable for containing and protecting any of a variety of motion-picture or video cameras from harsh and/or water environments.

SUMMARY OF THE INVENTION

The invention is directed to a shallow-water submersible splash housing which is capable of containing any of a variety of motion picture cameras, video cameras or the like, and sealing or shielding the camera from a water or other harsh environment. The submersible splash housing imparts panoramic (360 degree) viewing capability to the camera and may be provided with an internal air venting structure to prevent fogging of the housing during filming.

In one general aspect of the present invention, a shallow water submersible splash housing is provided which has a simple construction and is capable of containing any of a variety of motion picture cameras or video cameras and the like for filming in a water or other harsh environment. The shallow water submersible splash housing typically comprises:

a flexible or elastomeric transparent enclosure;

a front port assembly closing the front end of the enclosure; and a back plate assembly closing the rear end of the enclosure.

In a further aspect of the present invention, the rear plate assembly is removably attached to the enclosure.

In still a further aspect of the present invention, a camera-mounting frame is provided on the front port assembly for the mounting of a camera in the enclosure.

In another aspect of the present invention, the front port assembly is fitted with multiple iris rods that mount the camera-mounting frame on the port assembly to facilitate mounting of the camera in the enclosure.

In yet another aspect of the present invention, the front port assembly is pivotally mounted on an assembly mounting frame and can be pivoted to a horizontal position to facilitate mounting the camera on the camera-mounting frame and to a vertical position in which the camera is disposed in a functional or filming position inside the enclosure.

In still another aspect of the present invention, the front port assembly is fitted with at least one exterior airflow nozzle to facilitate blowing of air onto the exterior of the front port assembly.

In another aspect of the present invention, the front port assembly is fitted with at least one interior air flow nozzle to facilitate blowing of air onto the interior of the front port assembly, as well as to maintain a positive air pressure inside the enclosure and prevent fogging of the front port assembly.

In still another aspect of the present invention, the rear plate assembly is fitted with a bellows system through which control cables and power cables for the camera can be inserted.

In another aspect of the present invention, the flexible or elastomeric transparent enclosure lacks penetrations.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 is a side view of the front port assembly and camera-mounting frame pivotally mounted on the frame plate of the submersible splash housing, with the front port assembly and camera-mounting frame shown in the camera-mounting position and more particularly illustrating loading of a camera (shown in phantom) on the camera-mounting frame;

FIG. 4 is a side view of the front port assembly and camera-mounting frame pivotally mounted on the frame plate of the submersible splash housing, with the camera mounted to the camera-mounting frame and the front port assembly and camera-mounting frame shown in the functional position;

DETAILED DESCRIPTION OF THE PREFERRED EMBODIMENTS

Shown throughout the Figures, the invention is directed to a shallow water submersible splash housing which has a simple construction and is adapted to contain and seal, shield or protect any of a variety of motion-picture cameras, video cameras or the like while filming in a water or harsh environment. The submersible splash housing may be fitted with multiple iris rods to facilitate mounting the camera inside the housing in conventional fashion.

Figure 5:
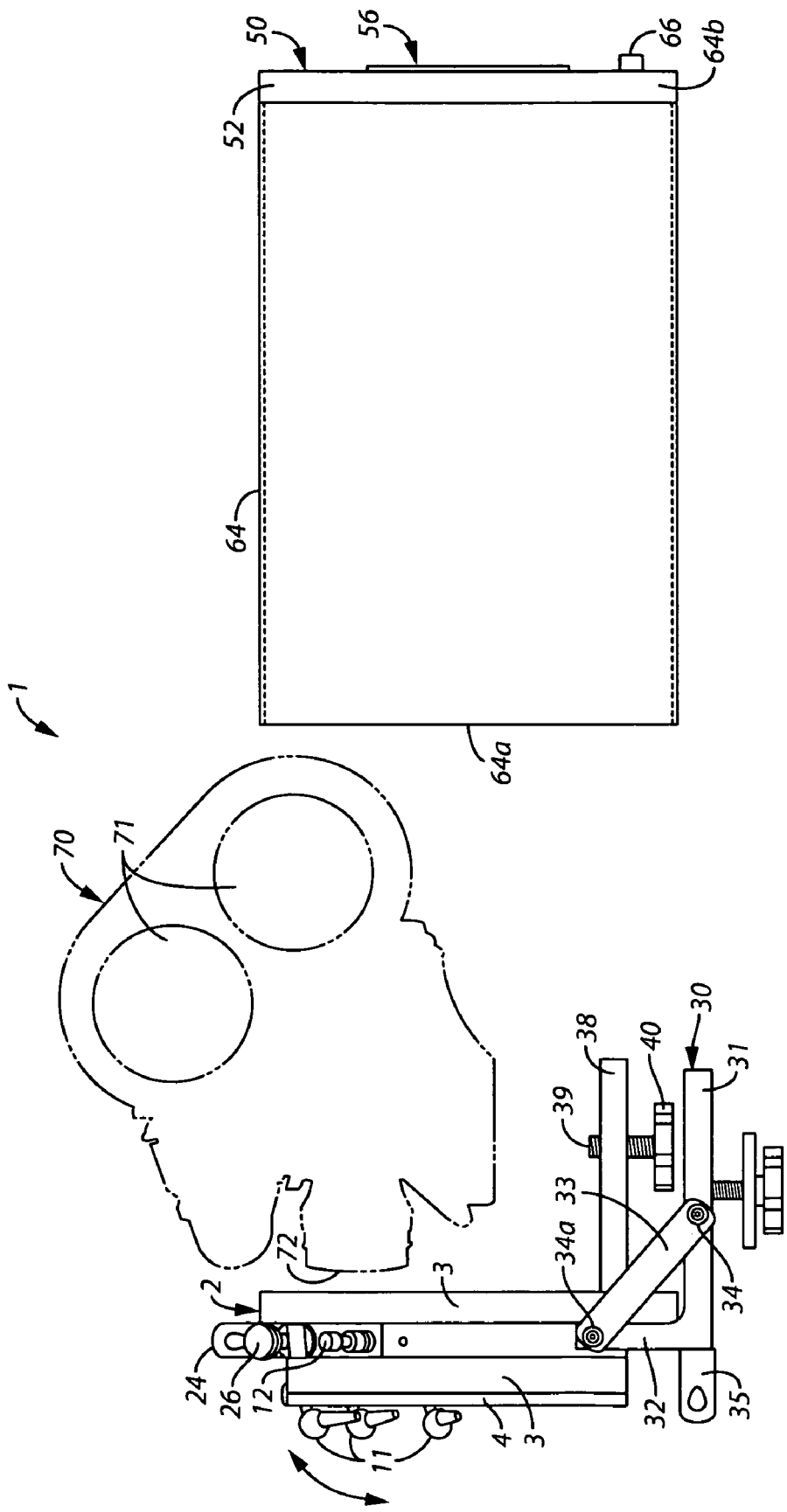
FIG. 5 is an exploded side view of the shallow water submersible splash housing, with the front port assembly and camera-mounting frame shown in the functional position, the rear plate assembly attached to the enclosure and the enclosure shown detached from the front port assembly, more particularly illustrating mounting of a camera (shown in phantom) on the camera mounting frame of the front port assembly.
Figure 6:
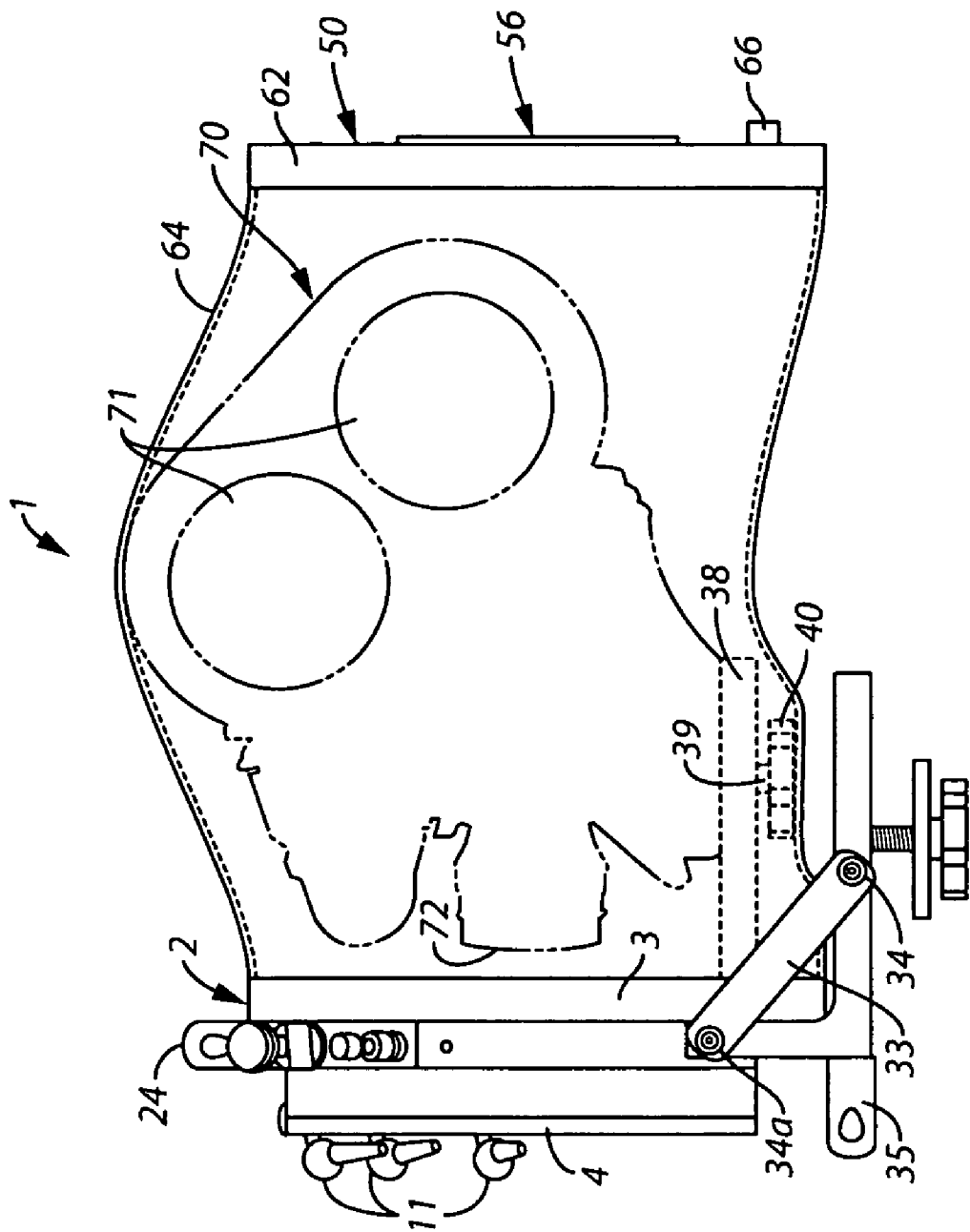
FIG. 6 is a side view of the assembled shallow water submersible splash housing, with the camera (shown in phantom) mounted inside the shallow water submersible splash housing.

Referring to FIGS. 1-6 of the drawings, a preferred embodiment of the shallow water submersible splash housing (hereinafter also referred to as "submersible splash housing" and "splash housing") of the present invention is generally indicated by reference numeral 1. Briefly, as illustrated in FIG. 6, the submersible splash housing 1 is suitable for containing a camera 70 (illustrated in phantom), such as a motion picture camera or video camera, for example, and sealing and protecting the camera 70 from a water environment or a wet or other harsh environment during filming in the environment. The submersible splash housing 1 includes a front port assembly 2 having a circular frame 3, which is typically anodized aluminum but may be any suitable alternative material. A window 4 is mounted on the frame 3 typically by extending multiple window mount bolts 5 (FIG. 1) through respective bolt openings (not illustrated) extending through the window 4 and threading the window mount bolts 5 into respective registering bolt openings (not illustrated) provide in the frame 3.

Figure 1:
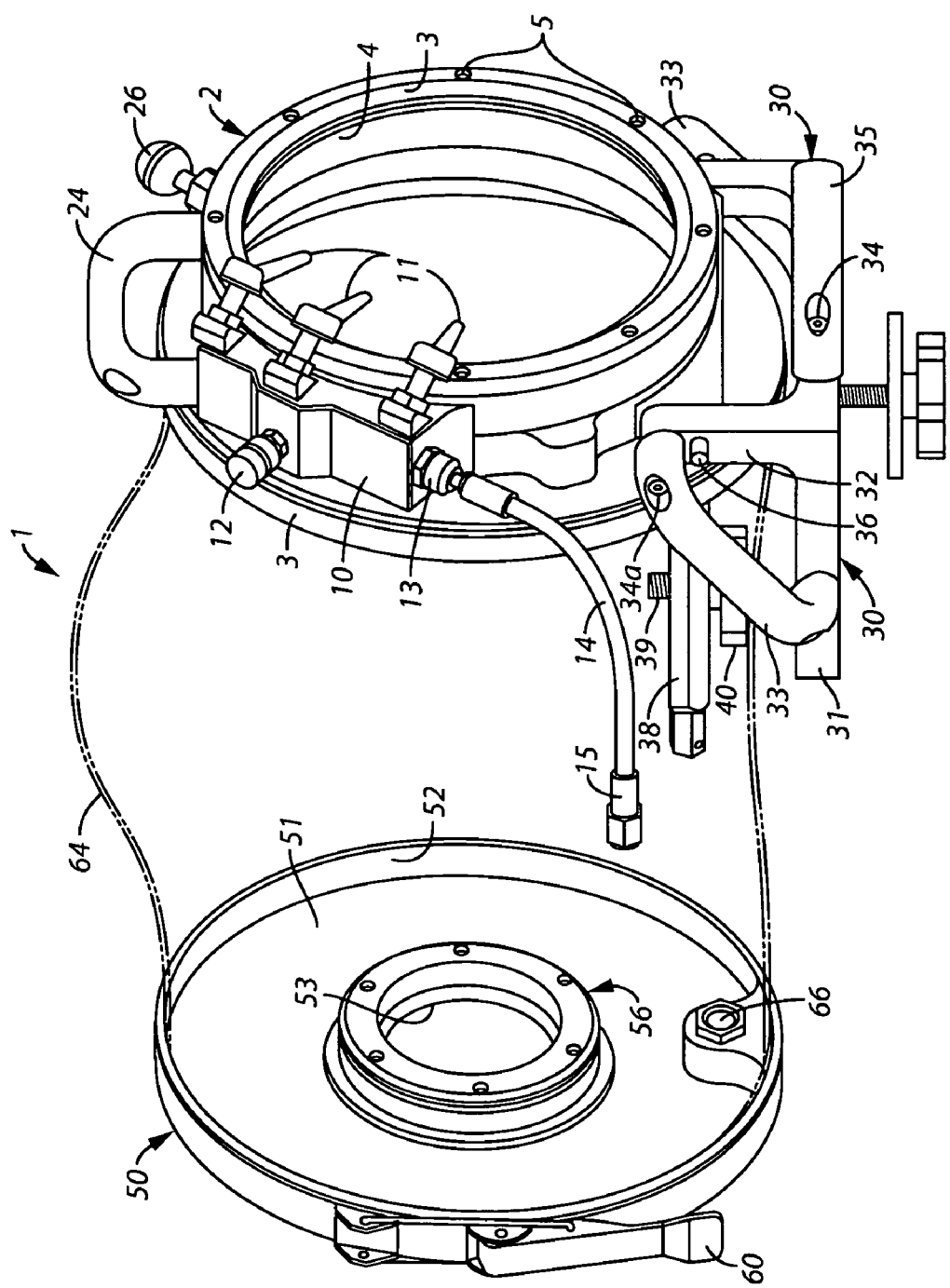
FIG. 1 is a perspective view of a preferred embodiment of the shallow water submersible splash housing of the present invention, with the enclosure of the housing shown in phantom.
Figure 2:
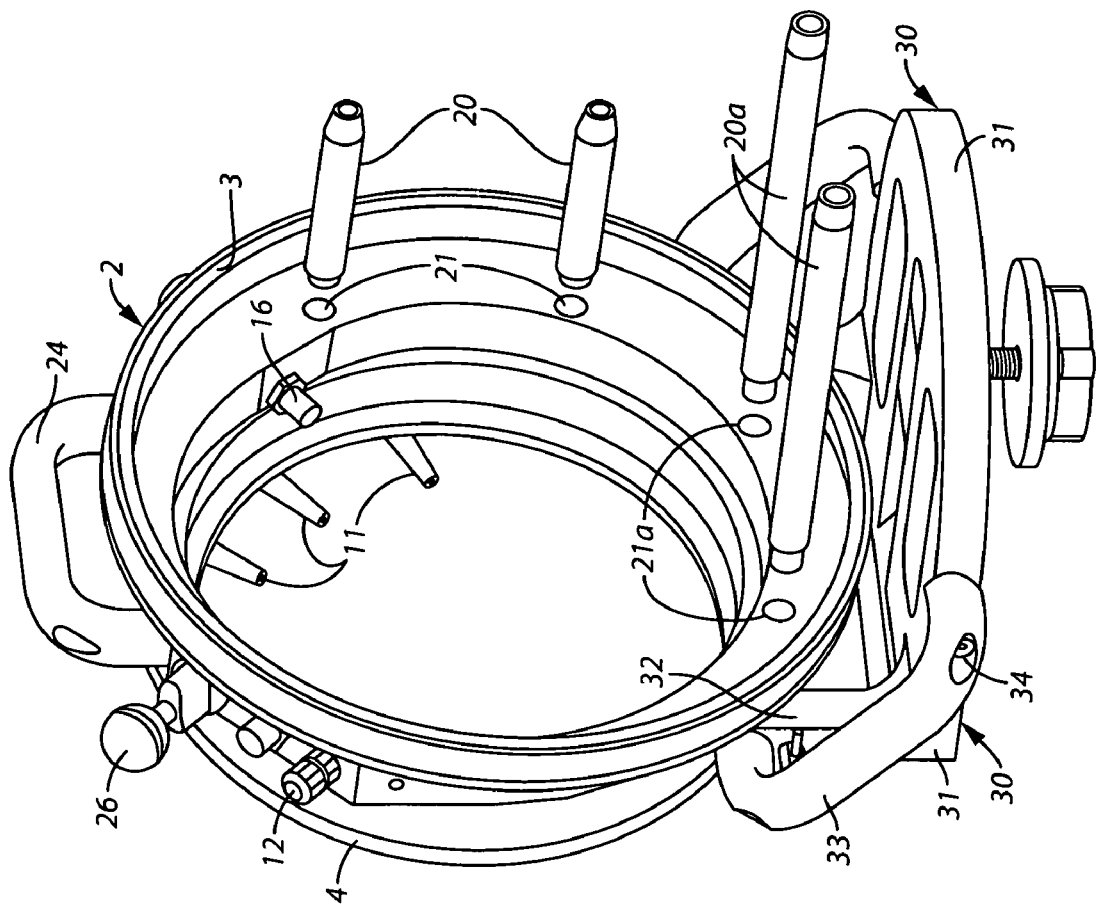
FIG. 2 is an interior perspective view of the assembly-mounting frame, the front port assembly pivotally attached to the assembly-mounting frame and multiple camera-mounting iris rods extending rearward from the front port assembly.

A top handle 24 may be provided on the upper curvature of the frame 3. An air supply manifold 10 is provided on the frame 3, on one or both sides of the top handle 24. Multiple exterior airflow nozzles 11 extend from the air supply manifold 10 and are directed toward the exterior surface of the window 4. As illustrated in FIG. 2, at least one interior airflow nozzle 16 extends from the air supply manifold 10 and into the frame 3. An interior air control valve 12 is provided on the air supply manifold 10 to control flow of air through the airflow nozzle 16. As illustrated in FIG. 1, a hose connection port 13 is provided on the air supply manifold 10. An air supply hose 14, having a hose coupling 15, is connected to the hose connection port 13. Accordingly, an air supply (not illustrated) is connected to the hose coupling 15 to deliver air through the air supply hose 14 to the air supply manifold 10. In use of the submersible splash housing 1, as will be hereinafter described, air is distributed from the air supply manifold 10, through the exterior air flow nozzles 11 and against the exterior surface of the window 4, to maintain clarity of the window 4 during filming in rain or other precipitation. Air is likewise distributed from the air supply manifold 10, through the interior airflow nozzle or nozzles 16 and against the interior surface of the window 4, to prevent interior fogging of the window 4. An arm attachment 26 for a light or monitor system may be further provided on the frame 3 of the front port assembly 2.

The front port assembly 2 is preferably pivotally mounted on an assembly-mounting frame 30, which typically has a frame plate 31 and a pair of spaced-apart assembly mount members 32 that extend at a generally 90-degree angle with respect to the frame plate 31. Side handles 33 may be attached to the frame plate 31 and the assembly mount members 32 on respective sides of the assembly-mounting frame 30. Accordingly, a handle mount bolt 34 (FIG. 5) extends through a handle opening (not illustrated) provided in each side handle 33 and is threaded into a registering bolt opening (not illustrated) provided in a corresponding side of the frame plate 31. A second handle mount bolt 34a extends through a handle opening (not illustrated) provided in each side handle 33 and is threaded through a registering bolt opening (not illustrated) provided in the corresponding assembly mount member 32. Each handle mount bolt 34a further extends through a bolt opening (not illustrated) provided in the frame 3 of the front port assembly 2 to pivotally mount the front port assembly 2 on the assembly-mounting frame 30. Therefore, the front port assembly 2 can be pivoted on the assembly-mounting frame 30 between the camera-mounting, horizontal position shown in FIG. 3, in which the camera-mounting frame 38 is disposed at a generally 90-degree angle to the frame plate 31 of the assembly-mounting frame 30, and the functional, vertical position shown in FIG. 4, in which the camera-mounting frame 38 is disposed in generally parallel relationship to the frame plate 31 of the assembly-mounting frame 30, for purposes which will be hereinafter described. A locking pin 36 extends through a pin opening (not illustrated) provided in an assembly mount member 32 and can further be selectively extended through a registering pin opening (not illustrated) provided in the frame 3 to selectively secure the frame 3 in the functional position shown in FIG. 4. A bottom handle 35 is mounted on the front surface of the frame plate 31; typically using a pair of handle mount bolts 34.

As illustrated in FIG. 2, a first pair of spaced-apart iris rod mount openings 21 and a second pair of spaced-apart iris rod mount openings 21a extend into the rear surface of the frame 3 of the front port assembly 2. Preferably, the iris rod openings of each pair of iris rod mount openings 21, 21a are provided at a spacing of 100 mm center-to-center with respect to each other. Each iris rod mount opening 21 is adapted to threadibly receive an elongated PANAVISION standard iris rod 20, and each iris rod mount opening 21a is adapted to threadibly receive an elongated ARRIFLEX standard iris rod 20a, which iris rods 20, 20a may be conventional. In typical use of the submersible splash housing 1, as will be hereinafter described, the PANAVISION standard iris rods 20 are suitable for mounting the camera-mounting frame 38 (FIG. 1) to the frame 3 of the front port assembly 2 in the mounting of a PANAVISION standard camera 70 to the camera-mounting frame 38, as will be hereinafter described. The ARRIFLEX standard iris rods 20a are suitable for mounting the camera-mounting frame 38 (FIG. 1) to the frame 3 of the front port assembly 2 in the mounting of an ARRIFLEX standard camera 70 to the camera-mounting frame 38, as will be hereinafter described. A threaded camera mount shaft 39 is typically threaded upwardly through a shaft opening (not illustrated), which extends through the camera-mounting frame 38, and a shaft knob 40 is provided on the lower end of the camera mount shaft 39. Accordingly, by rotation of the shaft knob 40, the camera mount shaft 39 is threaded into an interiorly threaded shaft aperture (not illustrated) which is conventionally provided in the camera 70 (FIGS. 3 and 4) to mount the camera 70 on the camera-mounting frame 38.

The submersible splash housing 1 further includes an elongated, flexible enclosure 64, which is preferably an elastomeric, transparent, synthetic, tubular material such as silicone, for example. As shown in FIG. 5, the enclosure 64 has a front end 64a and a rear end 64b. Preferably, the front end 64a of the enclosure 64 is fixedly attached to the frame 3 of the front port assembly 2, although for clarity the front end 64a is shown removed from the frame 3 in FIG. 5. Preferably, the enclosure 64 is silicone having a thickness of about 1/32 inch (0.198 mm) and lacks any penetrations to render the submersible splash housing 1 submersible in shallow water, as will be hereinafter described. As will be apparent to those skilled in the art, variations in the silicone thickness may be employed, depending upon the filming environment and/or application.

As illustrated in FIG. 1, a back plate assembly 50 is preferably detachably attached to the rear end 64b of the enclosure 64. The back plate assembly 50 includes a back plate 51 from which extends a rim 52. Accordingly, as illustrated in FIG. 1, a quick release tube clamp 60 may be provided on the outer surface of the rim 52 for removably engaging the enclosure 64 and attaching the enclosure 64 to the back plate assembly 50. A check valve air pressure vent 66 may be provided in the back plate 51 to vent air pressure in the submersible splash housing 1. A rear opening 53 extends through the back plate 51 of the back plate assembly 50, and a bellows system 56, which may be a conventional neoprene bellows system, for example, is provided in the rear opening 53. Camera power and control cables (not illustrated) can be extended from outside the submersible splash housing 1, through the bellows system 56, and into the submersible splash housing 1 in a watertight manner, and connected to the camera 70 when the camera 70 is mounted in the submersible splash housing 1, as will be hereinafter further described.

As illustrated in FIGS. 3-5, in use of the submersible splash housing 1, the camera 70 is initially mounted inside the submersible splash housing 1. The camera 70 may be a motion picture camera, for example, typically having a pair of reels 71 and a front lens 72. Alternatively, the camera 70 may be a video camera or any other suitable type of camera which is capable of being mounted on the camera-mounting frame 38 (FIG. 2) which is mounted on the front port assembly 2 using the PANAVISION standard iris rods 20 or ARRIFLEX standard iris rods 20a, depending on whether the camera 70 is compatible with the PANAVISION camera standard or the ARRIFLEX camera standard. Mounting of the camera 70 in the submersible splash housing 1 is accomplished by initially detaching the back plate assembly 50 from the rear end 64b of the enclosure 64 typically by releasing the quick release tube clamp 60 (FIG. 1). The front port assembly 2 is then pivoted to the horizontal, camera-mounting position of FIG. 3, in which the camera-mounting frame 38 is disposed in a vertical position, by releasing the locking pin 36 (FIG. 1) and pivoting the front port assembly 2 on the assembly-mounting frame 30, after which the flexible enclosure 64 is folded or compressed downwardly against the frame 3 of the front port assembly 2, as illustrated in FIG. 3. The camera 70 is then attached to the camera-mounting frame 38 by threading the camera mount shaft 39 into the threaded aperture (not illustrated) provided in the camera 70. Next, the front port assembly 2, with the camera 70 mounted thereon, is pivoted from the horizontal, camera-mounting position of FIG. 3 back to the functional, horizontal position shown in FIG. 4, in which position the camera-mounting frame 38 is disposed in a horizontal position. Accordingly, as illustrated in FIG. 6, the lens 72 of the camera 70 is located behind the window 4 of the front port assembly 2. Camera power and control cables (not illustrated) are connected to the camera 70 and extended through the bellows system 56 of the back plate assembly 50. The enclosure 64 is then extended back over the camera-mounting frame 38 and the camera 70 and attached to the back plate assembly 50 using the quick release tube clamp 60. An air supply (not illustrated) is connected to the hose coupling 15 (FIG. 1) provided on the air supply hose 14 for the delivery of air to the air supply manifold 10. The submersible splash housing 1 is then capable of being submerged in a shallow water body (not illustrated) for underwater filming, for example. It will be appreciated by those skilled in the art that the submersible splash housing 1 maintains the camera 70 in a dry condition as long as the submersible splash housing 1 is submerged in the water body. Furthermore, by operation of the interior air control valve or valves 12 (FIG. 1), air can be distributed from the air supply manifold 10 and into the submersible splash housing to maintain positive air pressure in the submersible splash housing 1 and prevent interior fogging of the window 4. Excessive air pressure in the submersible splash housing 1 is released through the check valve air pressure vent 66 (FIG. 1). In the event that filming is carried out in rain or other precipitation, air can be distributed from the air supply manifold 10, through the exterior airflow nozzles 11 and against the exterior surface of the window 4 to maintain clarity of the window 4 during filming.

While the preferred embodiments of the invention have been described above, it will be recognized and understood that various modifications can be made in the invention and the appended claims are intended to cover all such modifications which may fall within the spirit and scope of the invention.

What is claimed is:

1. A submersible splash housing for enclosing a camera, comprising:
    an elastomeric transparent enclosure having front and rear ends;
    a front port assembly closing said front end of said enclosure for supporting the camera;
    a plurality of iris rods extending from said front port assembly into said enclosure and adapted to mount the camera in said enclosure;
    a window provided in said front port assembly; and
    a back plate assembly closing said rear end of said enclosure.

2. The submersible splash housing of claim 1 further comprising an air supply manifold carried by said front port assembly and at least one exterior air flow nozzle provided in pneumatic communication with said air supply manifold.

3. The submersible splash housing of claim 2 further comprising at least one interior air flow nozzle provided in fluid communication with said air supply manifold.

4. The submersible splash housing of claim 1 further comprising a camera-mounting frame carried by said front port assembly for supporting the camera in said enclosure.

5. The submersible splash housing of claim 4 further comprising an assembly-mounting frame and wherein said front port assembly is carried by said assembly-mounting frame.

6. The submersible splash housing of claim 5 further comprising a pair of side handles carried by said assembly-mounting frame.

7. The submersible splash housing of claim 1 further comprising an arm attachment for a monitor provided on said front port assembly.

8. The submersible splash housing of claim 1 further comprising a plurality of rod mount openings provided in said front port assembly and wherein said plurality of iris rods is inserted in said plurality of rod mount openings, respectively.

9. A submersible splash housing for enclosing a camera, comprising:
    an elastomeric transparent enclosure having front and rear ends;
    a front port assembly having an annular frame and closing said front end of said enclosure;
    a plurality of iris rods extending from said frame of said front port assembly into said enclosure;
    a camera-mounting frame carried by said plurality of iris rods and adapted to support the camera in said enclosure;
    a window provided in said frame of said front port assembly; and
    a back plate assembly closing said rear end of said enclosure.

10. The submersible splash housing of claim 9 further comprising an air supply manifold carried by said front port assembly and a plurality of exterior air flow nozzles provided in pneumatic communication with said air supply manifold.

11. The submersible splash housing of claim 10 further comprising at least one interior air flow nozzle provided in fluid communication with said air supply manifold.

12. The submersible splash housing of claim 9 further comprising an assembly-mounting frame and wherein said front port assembly is carried by said assembly-mounting frame.

13. The submersible splash housing of claim 12 further comprising a pair of side handles carried by said assembly-mounting frame.

14. The submersible splash housing of claim 13 further comprising a plurality of rod mount openings provided in said front port assembly and wherein said plurality of iris rods is inserted in said plurality of rod mount openings, respectively.

15. The submersible splash housing of claim 9 further comprising an arm attachment for a monitor provided on said frame of said front port assembly.

16. The submersible splash housing of claim 9 wherein said back plate assembly is detachably connected to said rear end of said enclosure.

17. A submersible splash housing for enclosing a camera, comprising:
    an elastomeric transparent enclosure having front and rear ends;
    a front port assembly having an annular frame and closing said front end of said enclosure;
    a plurality of iris rods extending from said frame of said front port assembly into said enclosure;
    a camera-mounting frame carried by said plurality of iris rods and adapted to support the camera in said enclosure;
    a window provided in said frame of said front port assembly;
    a back plate assembly having a rear opening closing said rear end of said enclosure; and
    a bellows system provided in said rear opening of said back plate assembly.

18. The submersible splash housing of claim 17 further comprising an air supply manifold carried by said front port assembly and a plurality of exterior air flow nozzles and at least one interior air flow nozzle provided in pneumatic communication with said air supply manifold.

19. The submersible splash housing of claim 17 further comprising an assembly-mounting frame and wherein said front port assembly is pivotally carried by said assembly-mounting frame and pivotal between a camera-mounting position and a functional position on said assembly-mounting frame.

20. The submersible splash housing of claim 17 wherein said back plate assembly is detachably connected to said rear end of said enclosure and further comprising a quick release tube clamp carried by said back plate assembly for removably attaching said back plate assembly to said rear end of said enclosure.

* * * * *